US009642151B2

(12) United States Patent
Zhang et al.

(10) Patent No.: US 9,642,151 B2
(45) Date of Patent: May 2, 2017

(54) RADIO RESOURCE ADAPTATION METHOD AND ASSOCIATED WIRELESS COMMUNICATION DEVICES

(75) Inventors: Zhan Zhang, Beijing (CN); Jinhua Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 53 days.

(21) Appl. No.: 14/403,126

(22) PCT Filed: May 23, 2012

(86) PCT No.: PCT/CN2012/075953
§ 371 (c)(1),
(2), (4) Date: Nov. 21, 2014

(87) PCT Pub. No.: WO2013/173987
PCT Pub. Date: Nov. 28, 2013

(65) Prior Publication Data
US 2015/0110036 A1    Apr. 23, 2015

(51) Int. Cl.
*H04W 72/08*    (2009.01)

(52) U.S. Cl.
CPC ......... *H04W 72/085* (2013.01); *H04W 72/08* (2013.01)

(58) Field of Classification Search
None
See application file for complete search history.

(56) References Cited

U.S. PATENT DOCUMENTS

2011/0170499 A1   7/2011 Nayeb Nazar et al.
2012/0026986 A1*  2/2012 Dass ................... H04W 72/085
                                                        370/336

(Continued)

FOREIGN PATENT DOCUMENTS

CN    101291514 A    10/2008
CN    101409883 A     4/2009
(Continued)

OTHER PUBLICATIONS

Notification of Transmittal of the International Search Report and the Written Opinion of the International Searching Authority, or the Declaration for International Application No. PCT/CN2012/075953, mailed Mar. 7, 2013, 10 pages.
"RAN1 Chairman's Notes," 3GPP TSG RAN WG1 Meeting #68, Dresden, Germany, Feb. 6-10, 2012, 41 pages.
Notification of Transmittal of International Preliminary Report on Patentability for International Application No. PCT/CN2012/075953, mailed Aug. 29, 2014, 6 pages.
Extended European Search Report, EP Application No. 12877268.8, dated Apr. 28, 2016, 6 pages.

*Primary Examiner* — Kouroush Mohebbi
(74) *Attorney, Agent, or Firm* — NDWE LLP (57) ABSTRACT

The present invention discloses a radio resource adaptation method between UL and DL for two-way communications between a first communication device and a second communication device, comprising steps of: receiving, by the first communication device, fed-back information in an unused part of radio resource allocated to a second communication link (UL or DL) from the second communication device to the first communication device, the fed-back information enabling utilization efficiency enhancement of radio resource allocated to a first communication link (DL or UL) from the first communication device to the second communication device; and performing, by the first communication device, resource-efficient information transmission and/or retransmission on the radio resource of the first communication link, based on the received fed-back information. The present invention further provides associated wireless communication devices.

9 Claims, 8 Drawing Sheets

(56) References Cited

U.S. PATENT DOCUMENTS

2013/0107852 A1* 5/2013 Han .................. H04L 1/1861
                                                    370/329
2013/0272170 A1* 10/2013 Chatterjee ............ H04W 28/02
                                                    370/280

FOREIGN PATENT DOCUMENTS

| CN | 102036393 A | 4/2011 |
| EP | 2408247 A1 | 1/2012 |
| WO | 2012019348 A1 | 2/2012 |

* cited by examiner

RADIO RESOURCE ADAPTATION METHOD AND ASSOCIATED WIRELESS COMMUNICATION DEVICES

CROSS-REFERENCE TO RELATED APPLICATIONS

This application is a National stage of International Application No. PCT/CN2012/075953, filed May 23, 2012, which is hereby incorporated by reference.

FIELD OF THE INVENTION

The present invention generally relates to radio resource adaptation, and particularly, to a radio resource adaptation method between uplink and downlink and associated wireless communication devices.

BACKGROUND OF THE INVENTION

Until recently, the main service of the cellular network is voice service, for which traffics in the forward and reverse links (also known as downlink and uplink, or DL and UL for short) are almost balanced. Meanwhile, high rate data-service gets a quick boost nowadays and has become a major share of the cellular network service market. Such trend leads to very fluctuating load imbalance between UL and DL in a broadband cellular network.

In view of the status quo of a fixed UL/DL radio resource splitting such as a fixed bandwidth and time slot ratio in current FDD/TDD systems, the new generation of cellular network is thus facing a challenge of catering the time-varying demand on radio resource due to the dynamic traffic on both forward link and reverse link between a base station and a user equipment.

In wireless systems such as W-CDMA HSPA evolution and LTE-A, quite a few of important features are introduced to improve the efficiency of the spectrum utilization: e.g., multiple antenna technologies, inter-cell interference coordination, advanced receiver, relay technology, etc. However, the advanced technologies mentioned above do not solve such load imbalance problem directly.

Currently, it is more and more identified that a full/partial UL/DL radio resource pooling or flexible resource splitting is indispensable in future advanced air-interface because of more and more prominent traffic volume emerging in current and future radio services.

At present, for LTE TDD system, it is being widely discussed to dynamically change the TDD configurations in accordance with the DL/UL traffic imbalance. According to the proposed solution, more sub-frames are allocated for the link whose traffic is heavier. That is, the UL/DL radio resource splitting is substantively adjusted according to the traffic volumes on UL and DL.

Figure 1:
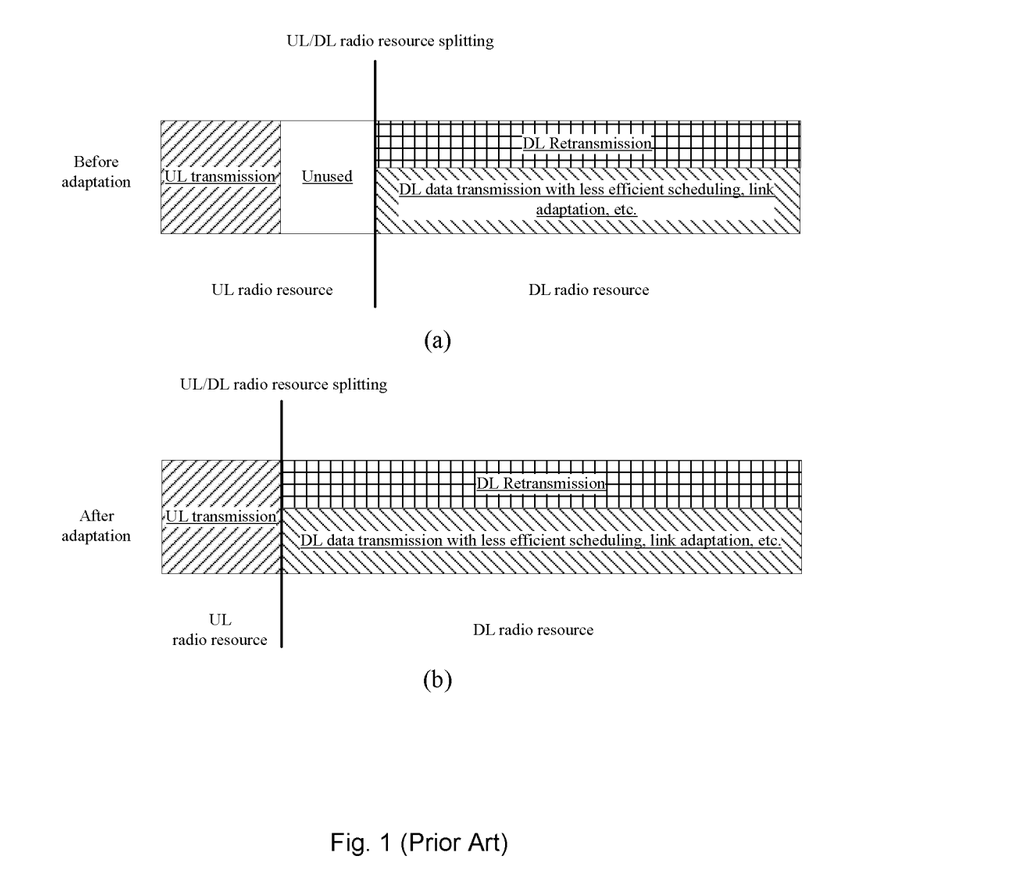
FIG. 1 schematically illustrates UL/DL radio resource pooling before and after radio resource adaptation according to the prior art.

FIG. 1 schematically illustrates the UL/DL radio resource pooling before and after the above mentioned radio resource adaptation scheme. As illustrated in FIG. 1(a), before radio resource adaptation, DL is heavily loaded with traffic while UL happens to be half-loaded. That is, the DL radio resource is exhausted while a significant part of the UL radio resource is unused. After adjusting the radio resource ratio between UL and DL by changing the TDD configuration according to the traffic volumes on UL and DL, the UL/DL radio resource splitting is substantively adjusted, as illustrated in FIG. 1(b).

Although there are no realistic measurements from the practice reported so far, the following shortcomings of such a solution can be predicted:

This solution is only applicable to the LTE-TDD based system.

There is additional DL/UL interference between adjacent eNodeBs with different TDD configurations due to such TDD configuration adaptation. Specifically, due to a high transmission power of radio access points (RAP), a DL transmitting RAP can result in performance degradation a victim RAP suffers in UL reception. Therefore, the benefit due to the adaptation of the UL/DL radio resource is offset by this RAPs interference problem. Though there might be some mitigating method to partially deal with this drawback, this problem still is a major obstacle to substantial and constant improvement of the system performance.

There is UE to UE interference when UEs served by cells with different TDD configurations are close together.

Possible impact on user experience during the TDD-configuration change.

There can be a high cost to solve the system stability problem for large scale deployment for LTE-TDD system or, in order to reduce the development and deployment cost, such technology is only deployed in some limited scenarios.

SUMMARY OF THE INVENTION

An object of the present invention is to achieve flexible UL/DL radio resource adaptation in case of UL/DL traffic imbalance and obviate at least some of the above disadvantages by providing a novel radio resource adaptation method and associated wireless communication devices.

To achieve the object, according to a first aspect of the invention, there is provided a radio resource adaptation method between UL and DL for two-way communications between a first communication device and a second communication device, comprising steps of:

receiving, by the first communication device, fed-back information in an unused part of radio resource allocated to a second communication link (UL or DL) from the second communication device to the first communication device, the fed-back information enabling utilization efficiency enhancement of radio resource allocated to a first communication link (DL or UL) from the first communication device to the second communication device; and performing, by the first communication device, resource-efficient information transmission and/or retransmission on the radio resource of the first communication link, based on the received fed-back information.

It should be noted that, in the first aspect of the invention, if a BS serves as the first communication device, a UE may serve as the second communication device. Conversely, if a UE serves as the first communication device, a BS may serve as the second communication device. That is to say, whether DL is loaded with traffic heavier than that of UL or UL is loaded more heavily than DL, the inventive radio resource adaptation method applies.

According to a second aspect of the invention, there is provided a communication device performing two-way communications with another communication device, said communication device comprising:

a fed-back information generator for generating fed-back information enabling utilization efficiency enhancement of radio resource allocated to a second communication link from the other communication device to the communication device;

a transceiver for transmitting the generated fed-back information to the other communication device in an unused part of radio resource allocated to a first communication link from the communication device to the other communication device and for receiving information transmitted from the other communication device.

Also, it is noted that the communication device in the second aspect of the invention may be a UE or a BS. Correspondingly, the other communication device may be a BS or a UE.

According to a third aspect of the invention, there is provided a communication device performing two-way communications with another communication device, said communication device comprising:

a transceiver for transmitting information to another communication device and for receiving fed-back information in an unused part of radio resource allocated to a first communication link from the other communication device to the communication device, the fed-back information enabling utilization efficiency enhancement of radio resource allocated to a second communication link from the communication device to the other communication device; and an information processor for preparing information to be transmitted and/or retransmitted in a resource-efficient manner, by taking advantage of the received fed-back information.

Similarly, in the third aspect of the invention, the communication device may be a BS or a UE, and the other communication device can be a UE or a BS correspondingly.

As the concept of the radio resource adaptation scheme according to present invention is based on interaction between transmitting and receiving sides rather than dependent on specific physical layer technologies, the proposed technical solutions apply for both TDD and FDD systems, including not only current 3GPP LTE-A evolution and future generations but also various other communication systems, such WCDMA-HSPA, TD-SCDMA, CDMA 2000, WIMAX, etc.

BRIEF DESCRIPTION OF THE DRAWINGS

The above and other objects, features, and advantages of the present invention will become apparent from the following descriptions on embodiments of the present invention with reference to the drawings, in which.

DETAILED DESCRIPTION OF THE PREFERRED EMBODIMENTS

Hereinafter, the present invention is described with reference to embodiments shown in the attached drawings. However, it is to be understood that those descriptions are just provided for illustrative purpose, rather than limiting the present invention. Further, in the following, descriptions of known structures and techniques are omitted so as not to unnecessarily obscure the concept of the present invention.

Figure 2:
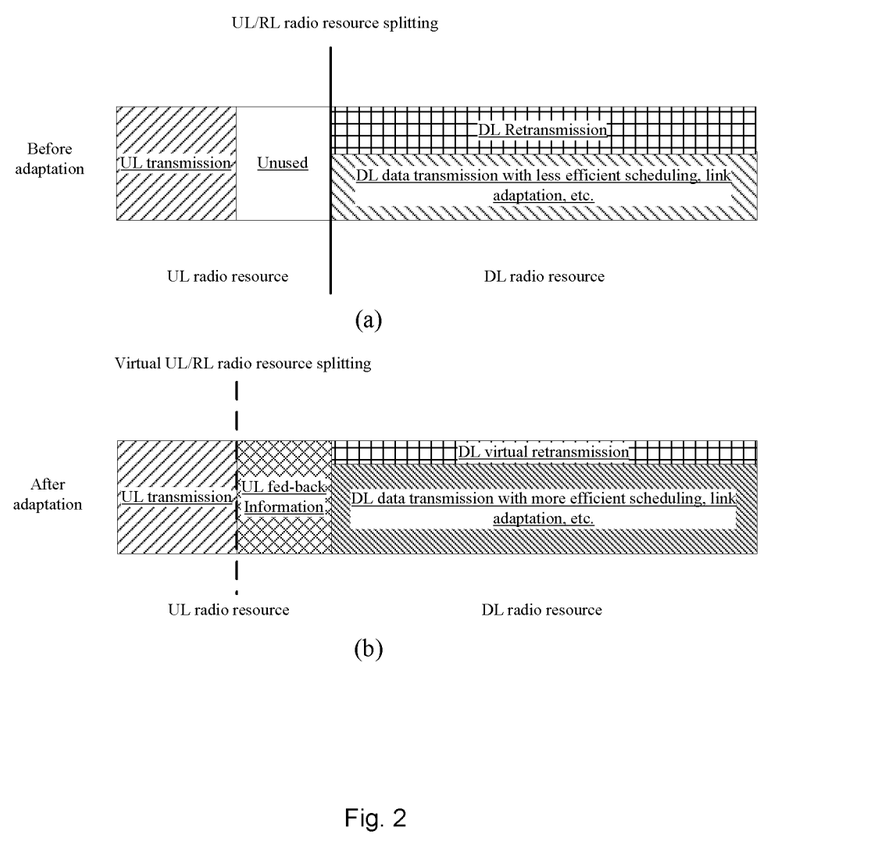
FIG. 2 schematically illustrates UL/DL radio resource pooling before and after radio resource adaptation according to the present invention.

FIG. 2 schematically illustrates UL/DL radio resource pooling before and after radio resource adaptation according to the present invention. As illustrated in FIG. 2(a), before radio resource adaptation, DL is heavily loaded with traffic while UL happens to be half-loaded. That is, the DL radio resource is exhausted while a significant part of the UL radio resource is unused. As can be seen from FIG. 2(b), through radio resource adaptation, UL fed-back information assisting DL transmission and retransmission takes up the unused part of the UL radio resource. In this regard, the UL/DL radio resource pooling is flexibly adjusted without a change in the physical layer signal format, such as UL/DL spectrum bandwidth and time slot ratio.

It should be noted that, although for simplicity FIG. 2 merely illustrates how the inventive radio resource adaptation scheme works in a case where DL is loaded with traffic heavier than that of UL, the inventive radio resource adaptation scheme is also applicable for a case where UL is loaded more heavily than DL. This is also true for the embodiments described below with reference to FIGS. 3-8.

Figure 3:
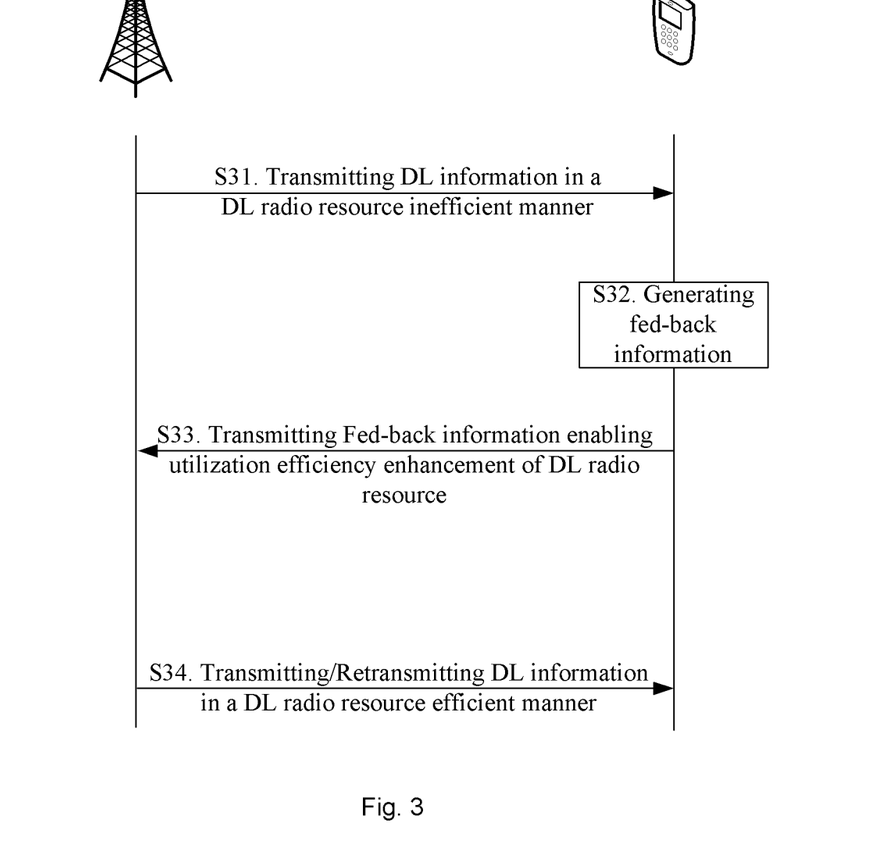
FIG. 3 is a chart schematically illustrating a general procedure of the radio resource adaptation according to the present invention.

FIG. 3 is a chart schematically illustrating a general procedure of the radio resource adaptation according to the present invention. Initially, at step S31, a BS transmits information to a UE in such a radio resource inefficient manner as shown in FIG. 2(a). At steps S32 and S33, the UE generates fed-back information enabling utilization efficiency enhancement of the DL radio resource, and transmits the fed-back information to the BS in an unused part of the UL radio resource. At step S34, the BS transmits and/or retransmits information to the UE in such a radio resource efficient manner as shown in FIG. 2(b), based on the fed-back information.

In contrast to the prior art radio resource adaptation scheme presented in the background, the radio resource adaptation scheme according to present invention builds a flexible UL/DL radio resource pooling without changing the physical layer signal format, such as UL/DL spectrum bandwidth and time slot ratio, and applies for both TDD and FDD systems.

In the above steps S32 and S33, the UE may generate and transmit any fed-back information to the BS, as long as it can help the BS to improve radio resource utilization efficiency. As an example, the fed-back information may include detection candidate sequences enabling resource-efficient information retransmission.

Figure 4:
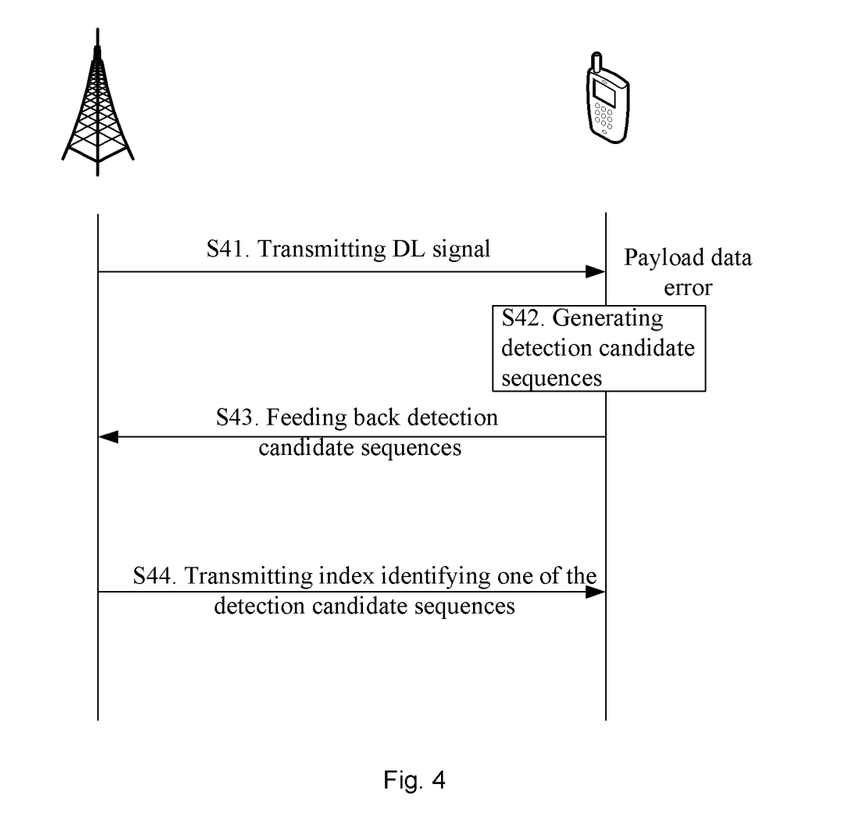
FIG. 4 is a chart schematically illustrating a specific procedure of the radio resource adaptation according to the present invention, wherein fed-back information includes detection candidate sequences enabling resource-efficient information retransmission.

FIG. 4 schematically illustrates a specific procedure of the radio resource adaptation according to the present invention, wherein the fed-back information includes the detection candidate sequences. Initially, at step S41, the BS transmits a signal to the UE. During the transmission of the signal, a payload data error occurs, which conventionally requires, for example, a data block or a packet retransmission. At step S42, the UE generates the detection candidate sequences, by, for example, obtaining from the received signal a data sequence to be detected and determining the detection candidate sequences as data sequences which are of smallest distances (errors) to the data sequence to be detected according to the UE's detector/decoder's criteria such as Euclidian distance or error vector magnitude (EVM) criteria.

At step S43, the UE feeds back the detection candidate sequences to the BS. At step S44, upon receiving them, the BS checks the fed-back detection candidate sequences, selects one of them, and transmits to the UE an index identifying the selected one in a smaller resource occupation than a full data-block retransmission.

Briefly, in the above exemplary procedure, the UE feeds back detection candidate sequences in UL to BS, and then, after examining the received copy of the sequences, the BS sends short instruction information to the UE as a virtual retransmission. To the UE, this short instruction information is equivalent to a full data-block or packet retransmission. Referring again to FIG. 2(b), in this way, the unused part of the UL radio resource accommodates fed-back information benefiting DL retransmission, and the DL radio resource needed for retransmission is significantly reduced.

As an enhancement, upon receiving the index, the UE may use the detection candidate sequence identified by the index as a whole or part of retransmission data to put it into the detector and decoder (such as a turbo decoder) along with previously received signals. By joining the information (e.g. log-likelihood soft information in turbo decoding) brought by and the previously received signals, the truly transmitted data could be recovered in a higher probability. This, in essence, equals to the conventional chase-combining HARQ effect in the real systems.

To further improve the utilization efficiency of the unused part of the UL radio resource, the UE may feed prudently the chosen parts of the detection candidate sequences back to the BS. For instance, the UE may send parts of the sequences related to low CQI PRBs or low likelihood, which parts are of a higher probability of data error.

In order to expand the capability to adjust the DL/UL radio resource loading ratio, the target data error (e.g., BLER) can be adjusted. For instance, the BLER target changing from 10% to 20% or even higher makes more NACK happen, and then according to the proposed technical solution the UL load increases due to more frequently fed back detection candidate sequences.

In addition to or instead of the detection candidate sequences, the fed-back information may include signal measurements, link qualities such as sub-channel qualities of link, inter-cell interference information such as inter-cell measurements, and/or statistics such as covariance matrixes.

Figure 5:
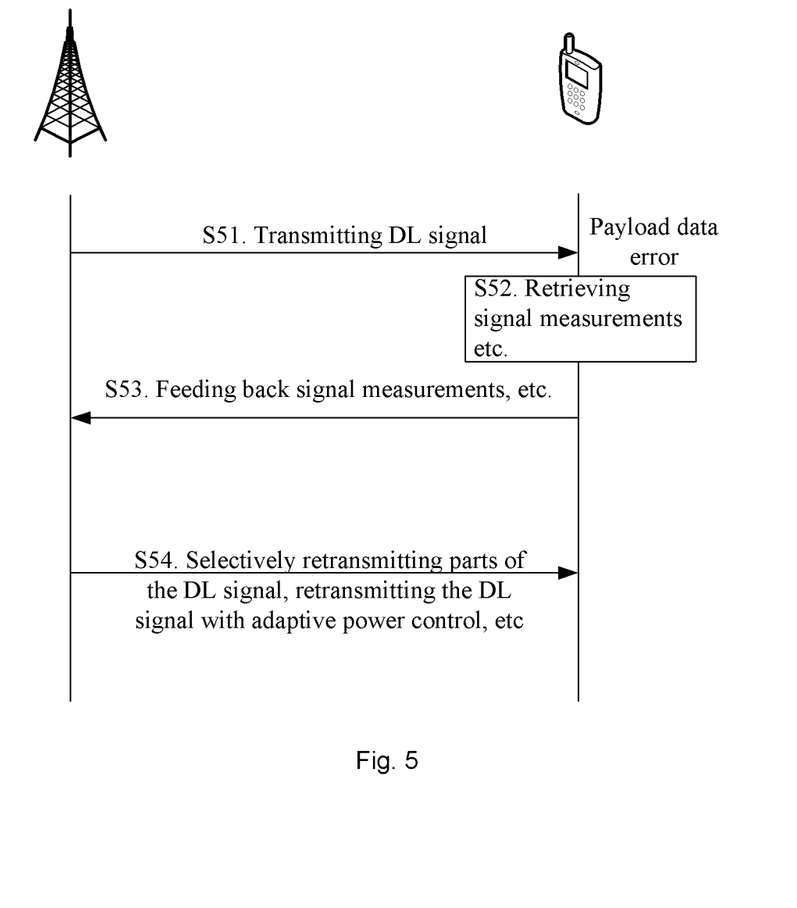
FIG. 5 is a chart schematically illustrating another specific procedure of the radio resource adaptation according to the present invention, wherein the fed-back information includes signal measurements, etc. enabling resource-efficient information retransmission.

FIG. 5 schematically illustrates another specific procedure of the radio resource adaptation according to the present invention, wherein the fed-back information includes signal measurements, etc. enabling resource-efficient information retransmission. Initially, at step S51, the BS transmits a signal to the UE. During the transmission of the signal, a payload data error occurs, which conventionally requires, for example, a data block or a packet retransmission. At steps S52 and S53, the UE retrieves and feeds back signal measurements (e.g., signal strength variation within a reception duration, signal raw bit information, etc.) for the received signal to the BS. Specifically, the UE can either report a mean of measurements or measured values of parts of the signal needed for a retransmission. For the former, at step S54, the BS can retransmit the whole signal but with a reduced transmission power if the mean of measurements is above a threshold. For the latter, at step S54, the BS can choose to retransmit a part of the signal whose previous transmission has a signal measurement lower than those of other parts to the UE; or the BS can retransmit the signal to the UE, and meanwhile performs adaptive power allocations for the parts of the retransmitted signal based on the signal measurements.

Figure 6:
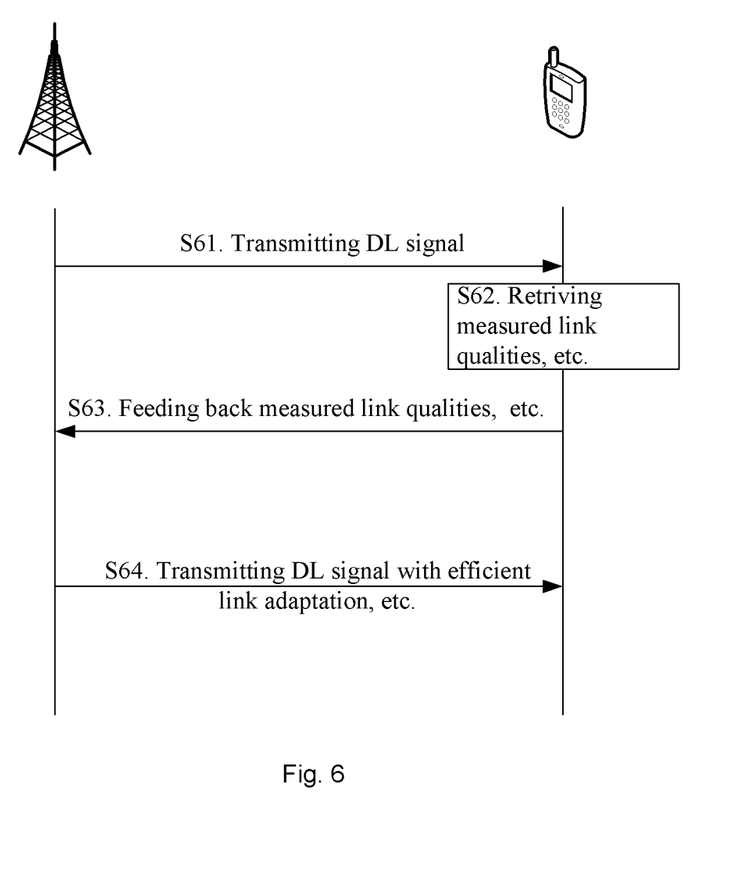
FIG. 6 is a chart schematically illustrating another specific procedure of the radio resource adaptation according to the present invention, wherein the fed-back information includes link qualities, etc. enabling resource-efficient information transmission.

FIG. 6 schematically illustrates another specific procedure of the radio resource adaptation according to the present invention, wherein the fed-back information includes link qualities, etc. enabling resource-efficient information transmission. Initially, at step S61, the BS transmits a signal to the UE. At steps S62 and S63, the UE retrieves and feeds back link qualities, such as sub-channel qualities of UL, or inter-cell interference information, etc. At step S64, the BS performs link adaptation according to sub-channel qualities of UL, or performs coordinated scheduling and beam forming with other base stations according to the inter-cell interference information. The inter-cell interference information may include some or all of the following, for instance, the cell ID of the main interferers, the interference strengths from different interferers, the most interfered PRBs, etc.

Referring again to FIG. 2(b), with the assistance of the above detail information fed-back in the unused part of UL radio resource, the BS can perform more efficient link adaptation and/or coordinated scheduling and beam forming, which in turn improve the utilization efficiency of the DL radio resource.

Various signaling can be used to support the feedback schemes described above. In a system such as LTE, possible signaling can be: newly defined instruction signaling over PDCCH, newly defined RRC signaling, and/or newly defined PDCCH formats. For a WCDMA-HSPA system, a new HS-SCCH order can be defined to enable/configure such feedback in addition to RRC signaling.

Via explicit or implicit signaling not limited to the above listed, the BS can configure feedback settings for the UE, so that the UE may be aware of how to constitute the fed-back information, how often to perform the feedback, etc.

Different constitutions of the fed-back information induce different loads in the feedback link. The choice of fed-back information elements can be determined according to load situation of the feedback link as well as its opposite link. One basic principle is that, the induced load can be accommodated by the feedback link and the key information assisting the opposite link shall be reported as much as possible.

Figure 7:
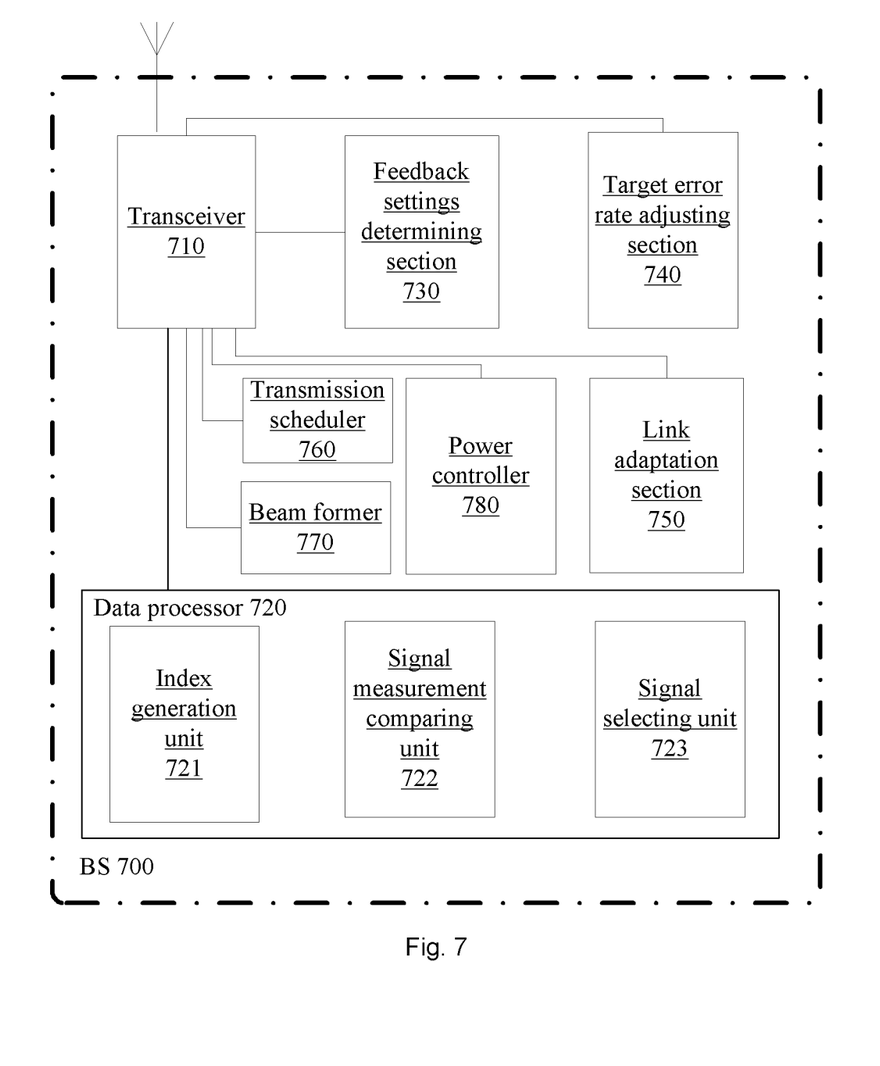
FIG. 7 is a block diagram schematically illustrating the structure of a BS according to the present invention.

In the following, the structures of the BS and UE involved in the radio resource adaptation procedure according to the present invention will be given with reference to FIGS. 7 and 8, respectively. As emphasized above, the structure shown in FIG. 7 is not dedicated to a BS, but applies to a UE. Also, the structure shown in FIG. 8 applies to either a UE or a BS.

As shown in FIG. 7, a BS 700 according to the present invention comprises a transceiver 710 and a data processor 720. The transceiver 710 is configured for transmitting information to a UE and for receiving fed-back information in an unused part of the UL radio resource, the fed-back information enabling utilization efficiency enhancement of the DL radio resource. The data processor 720 is configured for preparing information to be transmitted and/or retransmitted in a resource-efficient manner, by taking advantage of the received fed-back information.

The BS 700 may further comprise a feedback settings determining section 730, configured to determine feedback settings for the UE. The UE is informed of the determined feedback settings, via explicit or implicit signaling.

The data processor 720 may comprise an index generating unit 721. In a case where a payload data error occurs during transmission of a signal from the BS to the UE, the transceiver 710 may receive from the UE detection candidate sequences determined from the signal received by the UE from the BS. Then, the index generating unit 721 generates an index identifying one of the detection candidate sequences received from the UE, and the transceiver 710 transmits the index to the UE.

The BS 700 may further comprise a target error rate adjusting section 740 configured to adjust a target error rate with which the BS 700 performs data transmission, according to the amount of the unused part of the UL radio resource.

The data processor 720 may comprise a signal measurement comparing unit 722 and a signal selecting unit 723. In a case where a payload data error occurs during transmission of a signal from the BS to the UE, the transceiver 710 may receive from the UE signal measurements only for parts of the signal received by the UE from the BS. Then, the signal measurement comparing unit 722 compares the signal measurements, the signal selecting unit 723 selects a part of the signal whose transmission has a signal measurement lower than those of other parts, and the transceiver 710 retransmits the selected part of the signal to the UE.

The BS 700 may further comprise a power controller 780. In a case where a payload data error occurs during transmission of a signal from the BS to the UE, the transceiver 710 may receive from the UE signal measurements for parts of the signal received by the UE from the BS. Then, the power controller 780 controls the transceiver to retransmit the signal to the UE with adaptive transmission power based on the signal measurements.

Alternatively, the transceiver 710 may receive from the UE a mean of signal measurements for the signal received by the UE from the BS. Then, the signal measurement comparing unit 722 compares the mean of the signal measurements with a threshold, and, if the mean of the signal measurements is above the threshold, the power controller 780 controls the transceiver 710 to retransmit the signal to the UE with a reduced transmission power.

The BS 700 may further comprise a link adaptation section 750. In this case, the transceiver 710 may receive sub-channel qualities of DL from the UE, and the link adaptation section 750 performs link adaptation, according to the sub-channel qualities.

The BS 700 may further comprise a transmission scheduler 760 and a beam former 770. In this case, the transceiver may receive inter-cell interference information from the UE, the transmission scheduler 760 performs coordinated scheduling with other base stations, according to the inter-cell interference information, and the beam former 770 performs coordinated beam forming with other base stations, according to the inter-cell interference information.

Figure 8:
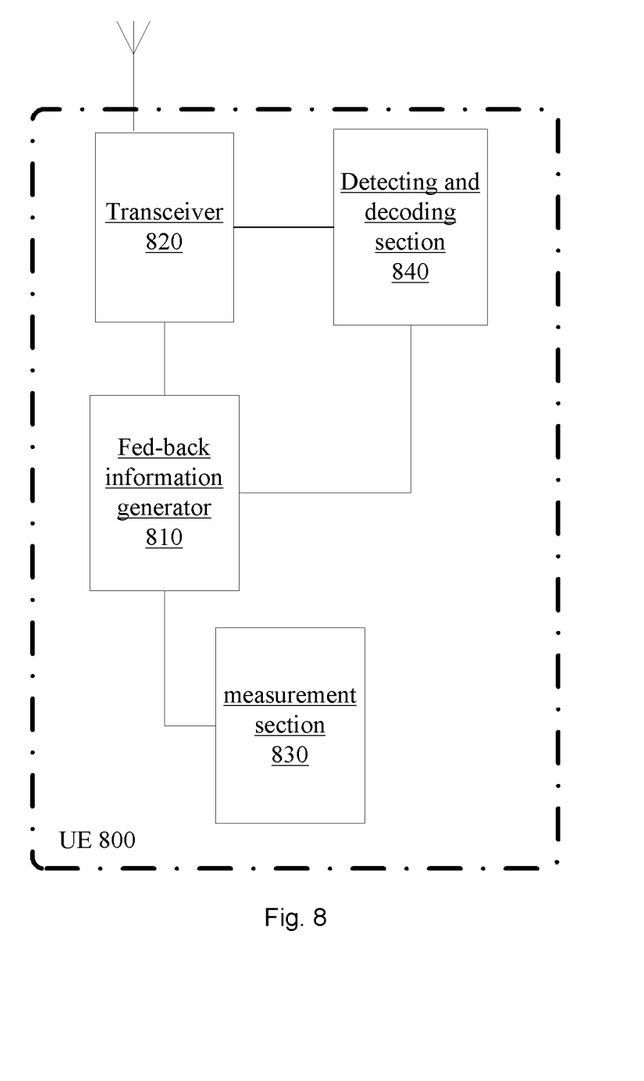
FIG. 8 is a block diagram schematically illustrating the structure of a UE according to the present invention.

FIG. 8 gives the structure of a UE 800 according to the present invention. As illustrated, the UE 800 comprises a fed-back information generator 810 for generating fed-back information enabling utilization efficiency enhancement of the DL radio resource; and a transceiver 820 for transmitting the generated fed-back information to the UE in an unused part of the UL radio resource and for receiving information transmitted from a BS.

The fed-back information generator 820 may generate fed-back information including at least one of the following: detection candidate sequences calculated from a signal received by the UE from the BS for data recovery, in a case where a payload data error occurs during transmission of the signal; signal measurements and/or link quality measured at the communication device; and inter-cell interference information detected at the communication device, in a case where the other communication device is a base station and the communication device is a user equipment.

The UE 800 may further comprise a data detecting and decoding section 840, which may obtain from the received signal a data sequence to be detected, and determine smallest distance data sequences of smallest distances to the data sequence to be detected according to a predetermined distance criterion, as the detection candidate sequences. Then, the fed-back information generator 810 may obtain the detection candidate sequences determined by the data detecting and decoding section 840, and the transceiver 820 may transmit the detection candidate sequences obtained by the fed-back information generator 810 to the UE, and receive from the BS an index identifying a detection candidate sequence selected by the BS.

Additionally, the data detecting and decoding section 840 may perform an HARQ process through joining information brought by the detection candidate data sequence identified by the index to previously received signals.

Alternatively, the data detecting and decoding section 840 may determine parts of the full length of smallest distance data sequences having a higher probability of data error than other parts of the smallest distance data sequences, as the detection candidate data sequences.

The UE 800 may further comprise a measurement section 830. In a case where a payload data error occurs during transmission of a signal from the BS to the UE, the fed-back information generator 810 may obtain signal measurements from the measurement section only for parts of the signal received by UE from the BS, and the transceiver 820 may transmit the signal measurements obtained by the fed-back information generator 810 to the BS, and receive from the BS a retransmitted part of the signal whose previous transmission has a signal measurement lower than those of other parts of the signal.

Alternatively, the fed-back information generator 810 may obtain signal measurements from the measurement section 830 for parts of the signal received by the UE from the BS. In this case, the transceiver 820 may transmit the signal measurements obtained by the fed-back information generator 810 to the BS, and receive from the BS parts of a retransmitted signal, for which adaptive power allocations are performed based on the signal measurements.

The fed-back information generator 810 may also obtain a mean of signal measurements from the measurement section 840 for the signal received by the UE from the BS. In this case, the transceiver 820 may transmit the mean of the signal measurements obtained by the fed-back information generator 810 to the BS, and receive from the BS a signal retransmitted with reduced transmission power, if the mean of the signal measurements is above a threshold.

In addition to those advantages mentioned above, other advantages of the proposed radio resource adaption scheme may be summarized as follows:

The proposed scheme can make the radio resource adaptation in a quick pace, even as short as a time period corresponding to a few of packets or frames.

The proposed scheme can be employed on interference management for the whole scale of cellular network because the judicious loading ratio changes in fact adjust the interference level. Adaptive adjustment and interference management also help improve the utilization efficiency of the radio resource.

The present invention is described above with reference to the embodiments thereof. However, those embodiments are provided just for illustrative purpose, rather than limiting the present invention. The scope of the invention is defined by the attached claims as well as equivalents thereof. Those skilled in the art can make various alternations and modifications without departing from the scope of the invention, which all fall into the scope of the invention.

ABBREVIATION LIST

FDD Frequency Division Duplex
TDD Time Division Duplex
W-CDMA Wideband Code Division Multiple Access
TD-SCDMA Time Division-Synchronization Code Division Multiple Access
WIMAX Worldwide Interoperability for Microwave Access
HSPA High Speed Packet Access
LTE Long Term Evolution
LTE-A Long Term Evolution-Advanced
BS Base Station
UE User Equipment
CQI Channel Quality Indicator
PRB Physical Resource Block
BLER BLock Error Rate
PDCCH Physical Downlink Control CHannel
RRC Radio Resource Control
HS-SCCH High Speed-Shared Control CHannel

What is claimed is:

1. A radio resource adaptation method using a first and a second communication link for two-way communications between a first communication device and a second communication device utilizing Frequency Division Duplex (FDD) or Time Division Duplex (TDD) operating with a fixed bandwidth or fixed time slot for the two-way communication, wherein a fixed first portion of the fixed bandwidth or the fixed time slot is allocated for the first communication link and wherein a fixed second portion of the fixed bandwidth or the fixed time slot is allocated for the second communication link, comprising:
receiving, by the first communication device, fed-back information in an unused part of radio resource allocated to the second communication link from the second communication device to the first communication device, the fed-back information enabling utilization efficiency enhancement of radio resource allocated to the first communication link from the first communication device to the second communication device, wherein the fed-back information includes at least one of:
detection candidate sequences calculated from a signal received by the second communication device from the first communication device for data recovery, in a case where a payload data error occurs during transmission of the signal;
at least one of signal measurements and link quality measured at the second communication device; and
inter-cell interference information detected at the second communication device, in a case where the first communication device is a base station and the second communication device is a user equipment; and
performing, by the first communication device, resource-efficient information transmission or retransmission on the radio resource of the first communication link, based on the fed-back information, by performing at least one of:
transmitting data with an adjustable target error rate, which is adjusted according to amount of the unused part of the radio resource of the second communication link;
retransmitting a part of the signal whose previous transmission has a signal measurement lower than other parts of the signal;
retransmitting the signal and performing adaptive power allocations for parts of the retransmitted signal; and
retransmitting the signal with a reduced transmission power, if a mean of the signal measurements is above a threshold.

2. The method according to claim 1, wherein
the first communication device performs the data transmission with the adjustable target error rate, which is adjusted according to an amount of the unused part of the radio resource of the second communication link.

3. The method according to claim 1, wherein
the second communication device transmits to the first communication device, signal measurements only for parts of the signal received by the second communication device from the first communication device, in the case where the payload data error occurs during transmission of the signal, and
the first communication device retransmits the part of the signal whose previous transmission has the signal measurement lower than the other parts of the signal to the second communication device.

4. The method according to claim 1, wherein
the second communication device transmits to the first communication device, signal measurements for parts of the signal received by the second communication device from the first communication device, in the case where the payload data error occurs during transmission of the signal, and
the first communication device retransmits the signal to the second communication device, and performs adaptive power allocations for the parts of the retransmitted signal based on the signal measurements.

5. The method according to claim 1, wherein
the second communication device transmits to the first communication device, the mean of the signal measurements for a signal received from the first communication device by the second communication device, in the case where the payload data error occurs during transmission of the signal, and
the first communication device retransmits the signal to the second communication device with the reduced transmission power, if the mean of the signal measurements is above the threshold.

6. A communication device performing two-way communications with another communication device using a first and a second communication link, wherein the communication device and the other communication device utilizing Frequency Division Duplex (FDD) or Time Division Duplex (TDD) operating with a fixed bandwidth or fixed time slot for the two-way communication, wherein a fixed first portion of the fixed bandwidth or the fixed time slot is allocated for the first communication link and wherein a fixed second portion of the fixed bandwidth or the fixed time slot is allocated for the second communication link, said communication device comprising:
a fed-back information generator for generating fed-back information enabling utilization efficiency enhancement of radio resource allocated to the second communication link from the other communication device to the communication device, wherein the fed-hack information generator generates the fed-back information including at least one of the following:
- detection candidate sequences calculated from a signal received by the communication device from the other communication device for data recovery, in a case where a payload data error occurs during transmission of the signal;
- at least one of signal measurements and link quality measured at the communication device; and
- inter-cell interference information detected at the communication device, in a case where the other communication device is a base station and the communication device is a user equipment; and a transceiver for transmitting the generated fed-back information to the other communication device in an unused part of radio resource allocated to the first communication link from the communication device to the other communication device and for receiving from the other communication device, in response to the fed-back information, a retransmitted part of the signal whose previous transmission has a signal measurement poorer than other parts of the signal, or parts of a retransmitted signal, for which adaptive power allocations are performed.

7. The communication device according to claim 6, further comprising a measurement section, and wherein
the fed-back information generator obtains signal measurements from the measurement section only for parts of the signal received by the communication device from the other communication device, in the case where a payload data error occurs during transmission of the signal, and
the transceiver transmits the signal measurements obtained by the fed-back information generator to the other communication device, and receives from the other communication device the retransmitted part of the signal whose previous transmission has a signal measurement poorer than other parts of the signal.

8. The communication device according to claim 6, further comprising a measurement section, and wherein
the fed-back information generator obtains signal measurements from the measurement section for parts of the signal received by the communication device from the other communication device, in the case where the payload data error occurs during transmission of the signal, and
the transceiver transmits the signal measurements obtained by the fed-back information generator to the other communication device, and receives from the other communication device parts of the retransmitted signal, for which adaptive power allocations are performed based on the signal measurements.

9. A communication device performing two-way communications with another communication device using a first and a second communication link, wherein the communication device and the other communication device utilizing Frequency Division Duplex (FDD) or Time Division Duplex (TDD) operating with a fixed bandwidth or fixed time slot for the two-way communication, wherein a fixed first portion of the fixed bandwidth or the fixed time slot is allocated for the first communication link and wherein a fixed second portion of the fixed bandwidth or the fixed time slot is allocated for the second communication link, said communication device comprising:
a transceiver for transmitting information to another communication device and for receiving fed-back information in an unused part of radio resource allocated to the second communication link from the other communication device to the communication device, the fed-back information enabling utilization efficiency enhancement of radio resource allocated to the first communication link from the communication device to the other communication device, wherein the fed-back information includes at least one of the following:
- detection candidate sequences calculated from a signal received by the other communication device from the communication device for data recovery, in a case where a payload data error occurs during transmission of the signal;
- at least one of signal measurements and link quality measured at the other communication device; and
- inter-cell interference information detected at the other communication device, in a case where the communication device is a base station and the other communication device is a user equipment; and a data processor for preparing information to be transmitted or retransmitted in a resource-efficient manner, based on the fed-back information, in which the transceiver performs at least one of:
- transmitting data with an adjustable target error rate, which is adjusted according to amount of the unused part of the radio resource of the second communication link;
- retransmitting a part of the signal whose previous transmission has a signal measurement lower than other parts of the signal;
- retransmitting the signal and performing adaptive power allocations for parts of the retransmitted signal; and
- retransmitting the signal with a reduced transmission power, if a mean of the signal measurements is above a threshold.

* * * * *